July 2, 1968 M. HACSKAYLO 3,391,309
SOLID STATE CATHODE
Filed July 15, 1963
FIG. 3
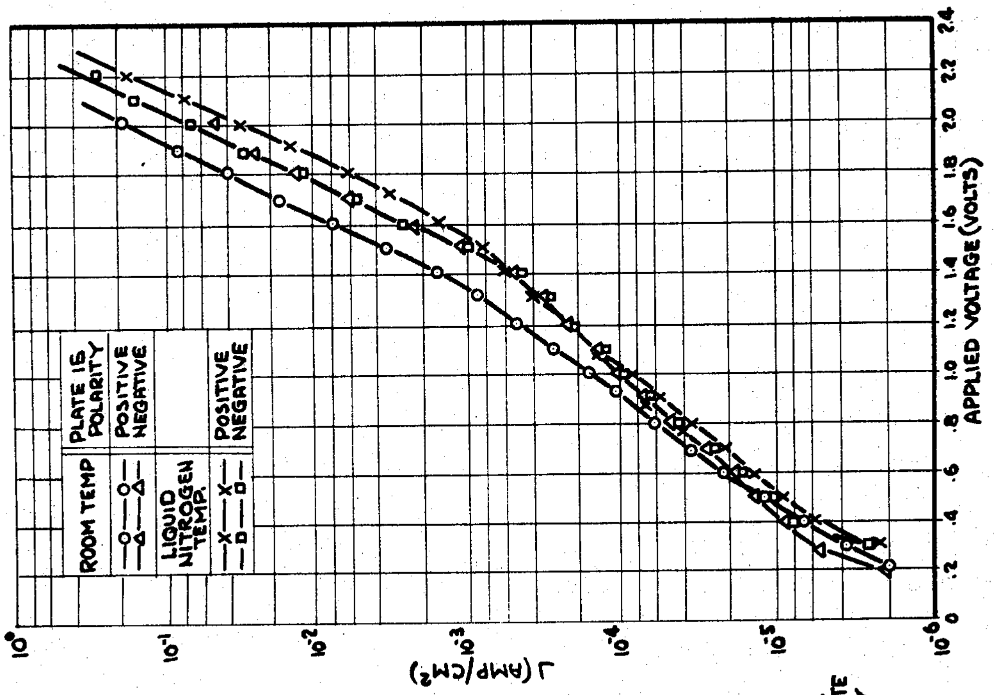
FIG. 1
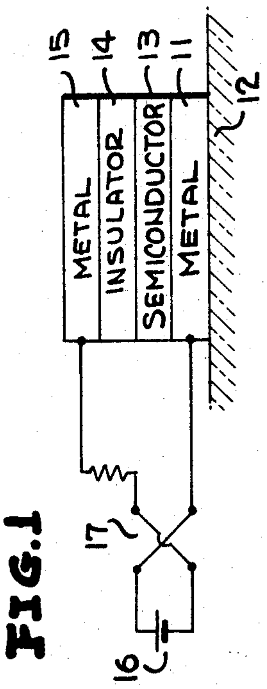
FIG. 2
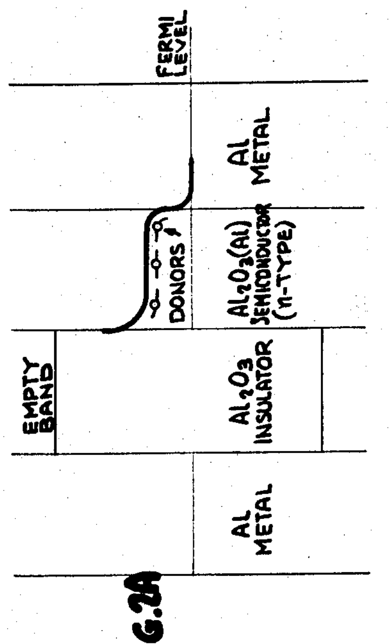
FIG. 2A
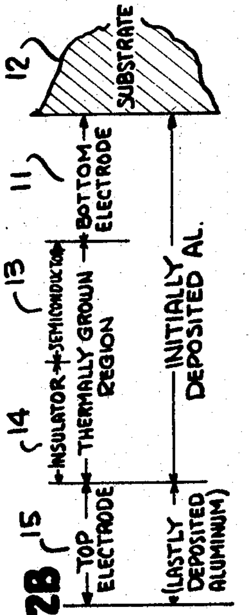
FIG. 2B
INVENTOR
MICHAEL HACSKAYLO
BY Hurvitz & Rose
ATTORNEYS United States Patent Office
3,391,309
Patented July 2, 1968

3,391,309
SOLID STATE CATHODE

Michael Hacskaylo, Falls Church, Va., assignor to Melpar, Inc., Falls Church, Va., a corporation of Delaware
Filed July 15, 1963, Ser. No. 294,820
5 Claims. (Cl. 317—235)

The present invention relates generally to active thin film circuits, more particularly to active thin film devices utilizing current sources relying upon a stable avalanche mechanism, and to the method of making such devices.

Thin film current sources, i.e., solid state cathodes, have been reported which rely upon tunnelling, field emission and space charge limited currents. None of these devices, however, has achieved current densities comparable with what is attained by a stable avalanche mechanism. According to the present invention, a solid state current source or cathode relying upon stable avalanche is achieved by forming separate semiconductor and insulating layers on a metallic source of electrons. The flow of current in response to avalanche mechanism occurs through both the semiconductor and insulating layers.

A two terminal device of the diode type is fabricated by depositing a layer of metal on the insulator to form a collector for the carriers propagating through the formed insulating layer.

Avalanche is attained in the present device because of the fabrication technique employed wherein the collector electrode is deposited with the substrate approximately at room temperature, 25°–120° C. for optimum current densities. This is in contrast to the high substrate deposition temperatures generally prevalent in the art that lead to tunnel emission rather than avalanche emission.

It is, accordingly, an object of the present invention to provide a new and improved current source particularly adapted for use in active thin film devices, and to a method for making such a source.

Another object of the present invention is to provide a current source relying upon a stable avalanche mechanism so that high current densities are achieved.

A further object of the present invention is to provide a new and improved solid state cathode wherein separate semiconducting and insulating layers are formed on an emitter of charged particles.

Yet a further object of the present invention is to provide a method for fabricating solid state cathodes wherein the metal electrodes are deposited at relatively low temperatures so current flow in response to avalanche mechanism occurs.

The above and still further objects, features and advantages of the present invention will become apparent upon consideration of the following detailed description of one specific embodiment thereof, especially when taken in conjunction with the accompanying drawings, wherein:

FIGURE 1 is a diagrammatic illustration of a preferred embodiment of a solid state cathode according to present invention;

FIGURE 2 is an energy diagram illustrating the mechanism whereby the cathode of FIGURE 1 functions; and FIGURE 3 is a graph of current versus voltage for the cathode of FIGURE 1 under varying circumstances.

Reference is now made to FIGURE 1 of the drawings wherein an electron emissive metal layer of pure aluminum 11, having a thickness of approximately 850 angstroms is secured on glass, silica, or quartz thin film substrate 12. On metal electrode 11 are grown $Al_2O_3(Al)$ n-type semiconductor, layer 13 and $Al_2O_3$ insulating layer 14, typically having thicknesses of approximately 60 to 80 angstroms, i.e., less than the free mean path of an electron through them. Both layers 13 and 14 exhibit stable avalanche properties to enhance the current density of the present device, as will be seen infra. Deposited on insulator 14 is a further aluminum layer 15 which has a thickness of approximately 1000 angstroms and a width of 20 mils. Layer 15 serves as the collector for the electrons migrating through semiconductor 13 and insulator 14 from emission source 11, provided it is biased positively relative to layer 11. Under reversed bias conditions, layers 11 and 15 are the collector and emitter of electrons, respectively.

To fabricate the solid state cathode of FIGURE 1 so it is capable of conducting current by the stable avalanche mechanism, a layer of aluminum approximately 1000 angstroms thick is deposited in a vacuum of $5\times10^{-6}$ torr on fused silica substrate 12, maintained at room or elevated temperatures. To form the oxide comprising layers 13 and 14, the aluminum deposited on substrate 12 is heated at approximately 400° C. for 20 to 30 minutes under atmospheric conditions. The device is now subjected to a vacuum of $5\times10^{-6}$ torr and aluminum layer 15 is deposited on insulating film 14 with the substrate at room temperature, between 25° C. and 120° C. for optimum results.

In the formation process, n-type semiconductor layer 13 is formed because there is a gradual variation of oxygen deficiency in the region between pure aluminum layer 11 and pure insulating $Al_2O_3$ layer 14. The deficiency is maintained in the finished product because the second electrode, aluminum layer 15, is deposited with substrate 12 at a relatively low temperature. If substrate 12 were at an elevated temperature, as is the general practice in the vacuum deposition art, further oxidation in layer 14 would occur causing a substantial decrease in the number of available charge carriers in the semiconductor layer. A greater oxygen content in layer 13 would cause tunnneling of electrons from emitter 11 through layers 11 and 15 rather than stable avalanche through semiconductor 13 and insulator 14. The latter phenomena of course is advantageous because the current density achieved thereby is 100 to 1000 times as great as that attained by tunnel emission.

Reference is now made to FIGURES 2*a* and 2*b*, the latter schematically illustrating the relative positions of layers 11, and 13–15 on substrate and the former showing the energy levels in the corresponding layers. From FIGURE 2A, it is seen that a number of free donor current carriers, i.e. electrons, exist in semiconductor layer 13, which carriers have energies greater than $\phi$ above the donor level at the boundary of layers 13 and 14. Electrons emitted from plate 11, with plate 15 positively biased, flow through layers 13 and 14 in accordance with the stable avalanche phenomena. When plate 15 is biased sufficiently forward, there is an additional contribution of electrons from semiconductor layer 13 to the avalanche flow through insulator 14.

It has been experimentally found that the specimens of FIGURE 1 have the voltage versus current characteristics illustrated in FIGURE 3. The density of current flow between electrodes 11 and 15 varies from $10^{-6}$ to 1 amperes per $cm.^2$ over a range of positive and negative voltages from 0 to 2.5 volts, as determined by D.C. source 16, reversing switch 17 and resistor 18, connected across plates 11 and 15.

Three principal features that aid in understanding the operation of the present invention and point out advantages thereof are illustrated by the curves of FIGURE 3. First, the curves may be divided into two separate portions, shown as straight line segments, the first between 0.2 and approximately 1.55 volts (actually extending from about 1.4 to 1.7 volts) and the second above 1.55 volts. The two segments indicate, in all probability, that a two layer film is present. The second observation is that both straight lines define exponential between the applied voltage and resulting current.

Thirdly, the current-voltage response with electrode 15 positively biased relative to electrode 11 is temperature dependent, whereas the response with electrode 11 positively biased is temperature insensitive. This is seen by noting that the triangular and rectangular plotting points are coincidental while the circular and crossed points are displaced. Hence, if it is desired to provide a current source that is not effected by temperature, the device of FIGURE 1 may be utilized by applying a negative potential to plate 15. Also, the direction of rectification is controlled by changing the environment of the element from room to liquid nitrogen temperature.

The first and second observations from FIGURE 3 permit an empirical explanation of the stable avalanche mechanism through both layers 13 and 14 and a comparison of experimental and mathematical results.

It is known that the current-voltage characteristic of an insulating film series connected with a semiconducting film, each having a width less than the mean free path of an electron, is expressed as:

$$J=N_1e^{\beta V_1}+N_2e^{-\phi/kT_e\sigma V_2} \quad (1)$$

where $J$=current density $N_1$=constant current injection into the semiconductor layer $e$=base of natural logarithms $\beta$=temperature sensitive slope of the semiconducting layer, i.e. the factor by which current flow through the semiconductor increases as a function of temperature $N_2$=constant current injection into the insulating layer from the semiconductor $\phi$=potential barrier of the semiconducting layer, as shown in FIGURE 2*a*, a constant $k$=Boltzmann's constant $T$=temperature $\sigma$=thickness parameter of the insulating layer, and $V_1$ and $V_2$=the voltages across the semiconductor and insulators, respectively.

In the present case, $V_1$ and $V_2$ are assumed to be the same because the stable avalanche mechanism of either the insulator, as expressed by $N_2e^{\sigma V}$, or the semiconductor, as expressed by $N_1e^{\beta V}$, predominates. The current density injected into the insulator from the semiconductor is represented by $N_2e^{-\phi/kT}$, the semiconductor electron contribution.

An examination of Equation 1 reveals that the stable avalanche contribution of semiconductor 13 predominates over the current flow through insulator 14 for low voltages, between 0.2 and 1.4 volts, because of the relative values of $\beta$ and $\sigma$. At higher positive voltages on plate 15, Equation 1 indicates that the electron contribution from semiconductor 13 should cause the number of injected carriers in insulator 14 to be considerably multiplied. As a result, an increase in avalanche emission through insulator 14 is predicted, with insulator avalanche becoming the dominant current carrying factor above a certain positive or forward bias on electrode 15 relative to electrode 11.

In consequence, a sharp transition occurs in the mathematical relationship for current density when insulating and semiconductor layers exhibiting stable avalanche emission are series connected. For the n-type $Al_2O_3$ layer formed in the present case, this transition actually occurs at approximately 1.4 volts, as indicated by the curves of FIGURE 3.

Again considering Equation 1 with plate 15 presumed to be positively biased relative to plate 11, it is seen that temperature directly influences the semiconductor electron contribution determined by $e^{-\phi k/T}$. For low temperatures, the value of the exponential is almost zero so the semiconductor electron influence is practically nil. In consequence, there are few carriers injected into insulator 14 by the electron contribution of semiconductor 13, no matter what voltage is across electrodes 11 and 15. As T increases, the semiconductor contribution becomes significant as the exponential value varies from $$\lim_{T\to 0} e^{-\phi/kT}=0 \text{ to } \lim_{T\to\infty} e^{-\phi/kT}=1$$

As a result, total current through insulating layer 14 is appreciable only if sufficient voltage is applied across the layer to enhance stable avalanche phenomena, as determined by $e^{\sigma V}$.

An analysis of Equation 1 therefore dictates that the rate of current change i.e. $dJ/dT$, for low and high temperatures be: (1) different for voltages less than the transitional value and (2) approximately equal for positive voltages on plate 15 above the transitional voltage. Inspection of FIGURE 3 reveals this to be the case for the cathode of FIGURE 1 wherein the transition is at approximately 1.4 volts.

As a further point, consider the case where plate 15 is negative relative to plate 11. Under such conditions, the voltage across the semiconductor layer does not affect the electron contribution because $\phi$ is assumed to be zero. The semiconductor electron contribution under such circumstances is not a significant factor, and temperature has little effect on total current flow through the two layers. This is confirmed by the virtually identical curves indicated by the squares and triangles of FIGURE 3.

It is seen therefore that the expected mathematical and actual experimental results for stable avalanche emission, enhanced by an electron contribution of semiconductor layer 13 are in agreement for the active thin film element of FIGURE 1.

While aluminum has been illustrated as the specific material for emission source 11, it is to be understood that other readily oxidizable metals, e.g. chromium, magnesium and titanium would be suitable. Of course the emitter metals must be readily oxidizable to form the requisite semiconductor and insulating layers. While the selection of metals for collector 15 is less critical than the other layers, the collector must be stable in the expected operating environment, oxidation resistant, stress free, and adhere to the other deposited substrates. Hence, silver and platinum, as well as aluminum, may be utilized as collector 15.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A solid state cathode, comprising
   a layer of pure metal selected from the group aluminum. chromium, titanium and magnesium, and two superposed contiguous thin films respectively of an n-type semiconductive oxide of said metal contiguous to said layer and an insulative oxide of said metal contiguous to said semiconductive thin film, said thin films being about 60–80 A. thick and being integral with said layer of pure metal.

2. The combination according to claim 1 wherein said metal is aluminum.

3. A solid state cathode, comprising a layer of pure metal selected from the group consisting of aluminum, chromium, magnesium and titanium; a thin n-type semiconductor film consisting of an incompletely oxidized surface layer of said layer of metal; and a passive insulator consisting of an oxide of said metal disposed on said film; said film having a thickness less than 100 A. and forming a transition region for avalanche emission of electrons between said metal layer and said insulator.

4. A solid state avalanche emission device, comprising a layer of pure metal selected from the group consisting of aluminum, chromium, magnesium and titanium; a thin n-type semiconductor film consisting of a non-stoichiometrically oxidized surface layer of said metal layer; a further metal layer insulatively spaced by less than approximately 100 A. from the surface of said film remote from said pure metal layer; said film having a thickness less than approximately 100 A. and forming a transition region for avalanche emission of electrons between said pure metal layer and the insulative region separating said further metal layer and said film surface.

5. A solid state cathode, comprising a layer of aluminum, an n-type semiconductor film of $Al_2O_3(Al)$ disposed on a surface of said aluminum layer, and a passive insulating film of $Al_2O_3$ disposed on the surface of said semiconductor film remote from said aluminum layer, each of said semiconductor film and said insulating film having a thickness less than approximately 100 A.

References Cited

UNITED STATES PATENTS

| | | | |
|---|---|---|---|
| 2,766,509 | 10/1956 | Le Loup et al. | 29—25.3 |
| 2,822,606 | 2/1958 | Yoshida | 29—25.3 |
| 3,056,073 | 9/1962 | Mead | 317—234 |
| 3,204,161 | 6/1965 | Witt | 317—238 |

FOREIGN PATENTS

| | | |
|---|---|---|
| 918,098 | 7/1949 | Germany. |

OTHER REFERENCES

Bull. Am. Phys. Soc. Ser. II vol. 5, page 407(A) Nov. 25, 1960, articles by Drs. Jack Jahia and Hans Fredericks.

Proc. Phys. Soc. (London) B66, 613(1953), article by Mansfield, R.I.B.M.

Technical Disclosure Bulletin, vol. 5, No. 11, April 1963.

Vacuum Deposition of Thin Films, Chapman and Hall, 1956 (ch. 16, pp. 464–465 relied on).

JOHN W. HUCKERT, *Primary Examiner.*

M. H. EDLOW, *Assistant Examiner.*